United States Patent [19]
Schmidt

[11] Patent Number: 5,887,339
[45] Date of Patent: Mar. 30, 1999

[54] DEVICE FOR USE IN A PRESS FOR FEED OF FASTENERS AND FOR THEIR ATTACHMENT IN WORKPIECES BY PRESSING

[76] Inventor: Dieter Schmidt, Ludwig-Thoma-Strasse 2, Lappersdorf, Germany

[21] Appl. No.: 737,165
[22] PCT Filed: Apr. 25, 1995
[86] PCT No.: PCT/DE95/00538
  § 371 Date: Dec. 31, 1996
  § 102(e) Date: Dec. 31, 1996
[87] PCT Pub. No.: WO95/30513
  PCT Pub. Date: Nov. 16, 1995

[30] Foreign Application Priority Data
  May 6, 1994 [DE] Germany ............... 44 15 973.0
[51] Int. Cl.⁶ ............................................. B23P 21/00
[52] U.S. Cl. ............................................. 29/715; 29/798
[58] Field of Search ............... 29/709, 715, 716, 29/798, 809, 822; 221/278, 289, 294

[56] References Cited

U.S. PATENT DOCUMENTS

| | | | |
|---|---|---|---|
| 3,946,478 | 3/1976 | Goodsmith et al. | 29/716 |
| 4,164,072 | 8/1979 | Shinjo . | |
| 4,348,796 | 9/1982 | Smallegan | 29/798 |
| 5,224,659 | 7/1993 | Gabardi | 221/298 |
| 5,360,137 | 11/1994 | Shinjo et al. . | |
| 5,619,788 | 4/1997 | Schmidt | 29/798 |
| 5,660,516 | 8/1997 | Artrip et al. | 29/809 |

*Primary Examiner*—Frances Han
*Attorney, Agent, or Firm*—Hoffman, Wasson & Gitler

[57] ABSTRACT

A device, for use in a press, for feeding fasteners, especially nuts, and attaching the fasteners in workpieces by pressing with a punching head. Joining and pressing of the fasteners in the workpieces takes place, with an infeed and loading means on a tool or press part, and on a rigid feed, which together with a punching head can be attached to one of two antagonistic tool or press parts. A first conveyor section for the fasteners is located between the punching head and the loading means, and forms the fasteners. Each of the fasteners is supplied individually to a loading position of the loading means and each is moved by an infeed element from the loading position into a subsequent first conveyor section, forming a row which extends into the punching head, in which the fasteners tightly abut one another. An infeed element, for infeed out of an initial position outside of a conveyor section, is moved with an infeed surface into the conveyor section and is moved with an infeed stroke along the conveyor section is designed. The infeed element is moved back each time immediately following completed infeed into the initial position. At the loading position there is at least one stop for fasteners, which pass only with infeed by the infeed element.

12 Claims, 4 Drawing Sheets

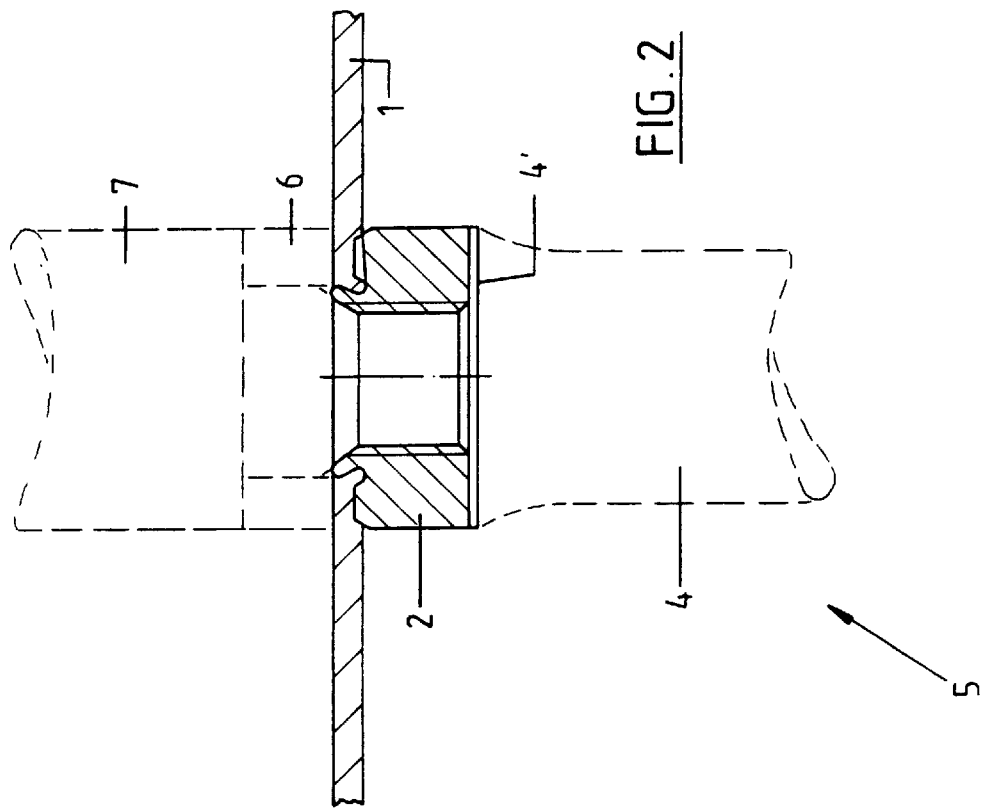
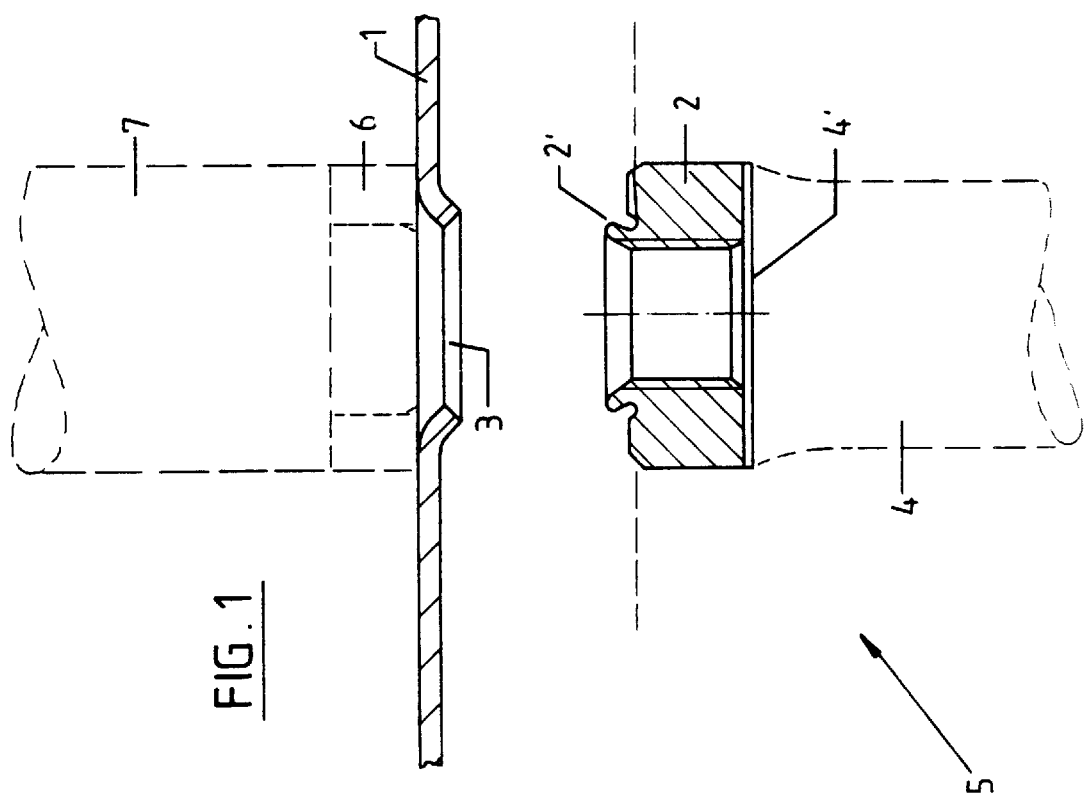

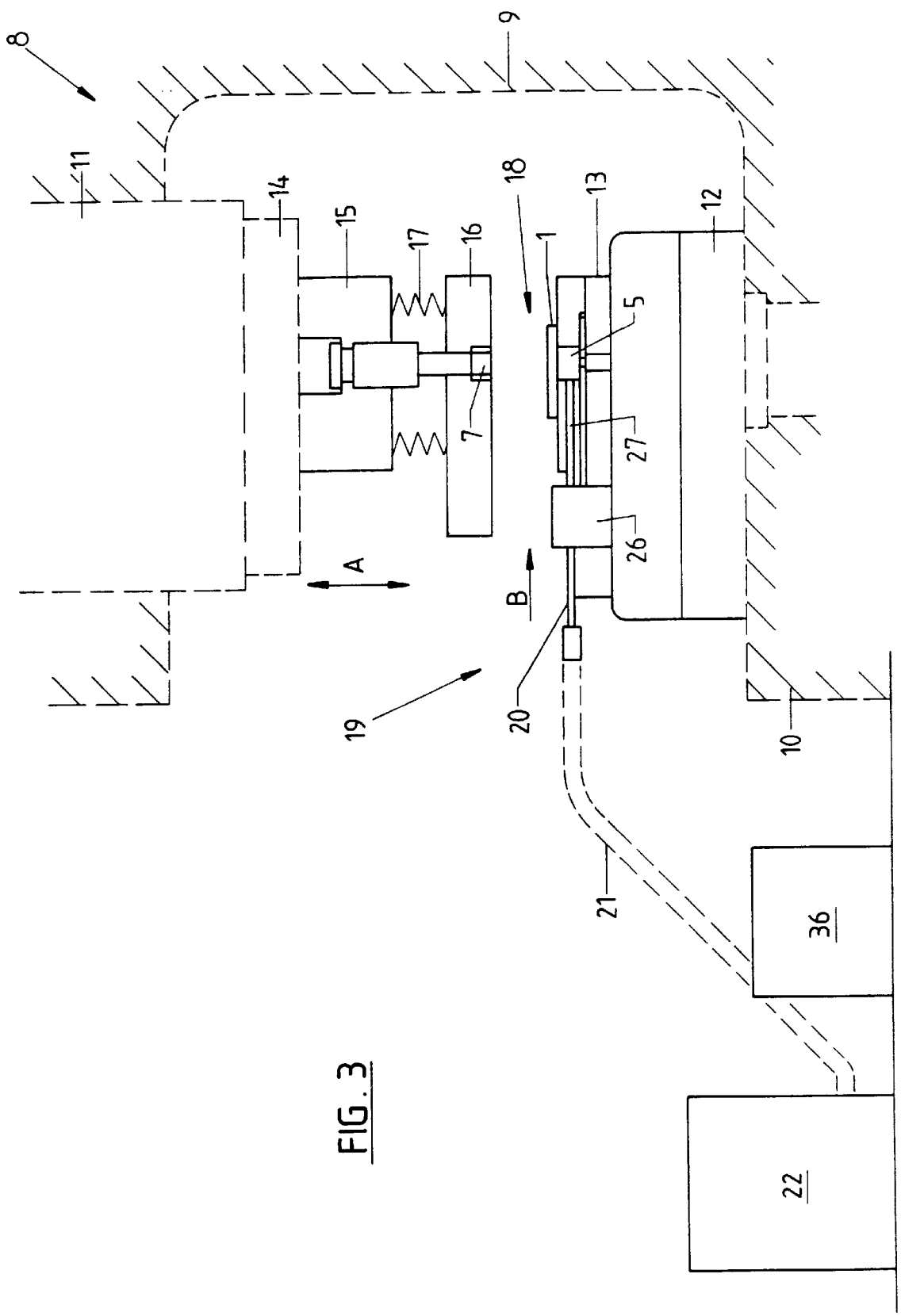

DEVICE FOR USE IN A PRESS FOR FEED OF FASTENERS AND FOR THEIR ATTACHMENT IN WORKPIECES BY PRESSING

FIELD OF THE INVENTION

The invention relates to a device, for use in a press, for feeding fasteners, especially nuts, and attaching the fasteners in workpieces by pressing with a punching head. Joining and pressing of the fasteners in the workpieces takes place, with an infeed and loading means on a tool or press part, and on a rigid feed, which together with a punching head can be attached to one of two antagonistic tool or press parts. A first conveyor section for the fasteners is located between the punching head and the loading means, and forms the fasteners. Each of the fasteners is supplied individually to a loading position of the loading means and each is moved by an infeed element from the loading position into a subsequent first conveyor section, forming a row which extends into the punching head, in which the fasteners tightly abut one another.

BACKGROUND OF THE INVENTION

Production of workpieces from sheet metal unwound from a coil (for example, steel sheet) or from individual sheets or plates using a press or tool located in this press (for example, also follow-on tools) by punching, by permanent deformation, etc. is known. Here, providing tools with fasteners at the same time in production in the press is also known, by joining or insertion of the pertinent fastener into a prepared (punched) hole and by subsequent pressing of the fastener in the workpiece.

Fasteners are, among others, nuts or threaded nut pieces which for example have a circular cylindrical peripheral surface and which are provided with a collar on one front face, with which the respective nut fits into the prepared hole of the workpiece and is attached there by pressing.

To feed and attach especially nuts in workpieces a device for use in a press, for feeding fasteners, especially nuts, and attaching the fasteners in workpieces by pressing with a punching head has been suggested (P 43 40 642.4-14). This device consists essentially of a punching head which is provided on one or two antagonistic tool or press parts, and with the interposition of an insertion plunger causes joining of the respective fastener into the prepared hole of the workpiece and also with the cooperation of the other of the antagonistic tool and press parts causes subsequent attachment or fixing of the fastener in the workpiece by pressing, i.e., by permanent deformation of the material of the workpiece in the area of the hole. Furthermore, the known device has a rigid feed on which a loading and infeed means is provided and which, between this loading means and the punching head, forms a first rigid conveyor section which ends in the punching head or in a plunger channel formed there and which in the transportation and conveyance direction of the fastener adjoins a second, likewise rigid conveyor section, in the area of which the infeed means is provided at the transition between the two conveyor sections.

In this device the infeed means has an infeed element made as an infeed rocker which is normally in an active position, in which it elastically adjoins by one surface the last fastener in the first conveyor section and in this way prestress this fastener for movement in the direction of the punching head.

From this active position which is the normal position of the infeed rocker, the latter is moved by the motion of the antagonistic tool or press parts into an inactive position in which the infeed rocker is outside of the rigid feed, during each downstroke of the press shortly before reaching bottom dead center of the press stroke. At bottom dead center of the press stroke the fastener which is ready in the punching head is joined to the workpiece. During the subsequent upstroke of the press a new fastener from the second conveyor section is reloaded into the first conveyor section by the infeed rocker which returns to the normal position, i.e., to the active position.

Among others, the disadvantage here is that for reloading from the loading position into the "first" conveyor section only a relatively short time is available, specifically the time of a partial stroke of the press directly after bottom dead center.

SUMMARY OF THE INVENTION

The object of this invention is to develop this device such that the time available for reloading is greatly prolonged, so that even with extremely high press performance (number of strokes per unit of time) operating reliability is improved.

To achieve this object a device having an infeed element, for infeed out of an initial position outside of a conveyor section, which can be moved with an infeed surface into the conveyor section and can be moved with an infeed stroke along the conveyor section is designed. The infeed element is moved back each time immediately following completed infeed into the initial position. At the loading position there is at least one stop for fasteners, which pass only with infeed by the infeed element.

For the purpose of the invention "press" is defined here as a machine with at least two tool or press parts which are antagonistic or which can move relative to one another. Preferably a press is a tool press of the initially mentioned type for producing workpieces from sheet metal by punching, permanent deformation, etc.

Antagonistic tool and press parts in this connection are those parts of the press or the tool provided in the press which are moved relative to one another in one axial direction, preferably in a vertical axis, and which act directly or indirectly on the workpiece to be manufactured or on the sheet metal used for this purpose.

These tool or press parts are for example the hold-down which travels accordingly up and down in the press stroke on the one hand and the opposite tool which interacts with it on the other, but also for example the press component which carries this opposite tool, for example, a clamping plate on the press table or an intermediate plate which is attached there for the opposite tool, etc.

One particular of the device according to the invention is among others that the infeed element is normally in the inactive position, i.e., this inactive position is the normal position of the infeed element, and is moved only for the infeed or reloading of a fastener into the first conveyor section out of this inactive position for infeed motion or an infeed stroke and subsequent backward motion or a backward stroke so that minus this short loading time which is necessary for the infeed and the return stroke the entire time or almost the entire time of a complete press stroke is available for routing a fastener to the loading position. Furthermore, reloading can also take place by the infeed element as much as possible independently of the press stroke, of course however only such that this reloading is completed each time before bottom dead center of the press movement is reached.

In the device according to the invention there is a stop for the fastener supplied at the time, at the loading station; the stop is passed by the fastener only during reloading, i.e., as it continues to move through the infeed element.

In the device according to the invention the fasteners are preferably nuts which are oriented with their axes parallel to one another and perpendicular to the infeed direction, not only in the rigid feed which together with the punching head and the loading means forms a complete structural unit, but also in an external feed via which the nuts reach the device from a supply or feed means.

The fasteners are supplied to the loading position by their being "injected" individually and in time succession using compressed air via the external feed and the second conveyor section to the loading position. Control of the external feed means and the loading means takes place via control electronics depending on the sensors provided on the rigid feed or their control signals, for example, such that whenever a stipulated number of fasteners is not present at the loading position, fasteners are conveyed by injection to the loading position until the required number of fasteners is present there and/or that when there is no fastener in the punching head or in the plunger channel there, by moving the infeed element and by injection of fasteners to the loading position the first conveyor section is reloaded until the first fastener present in this conveyor section is in the plunger channel.

A first sensor arrangement is located in the punching head or the plunger channel there. A second sensor arrangement is located in the area of the infeed means, the first sensor means recording the absence of a fastener on the punching head and causing injection of a fastener to the loading positions and reloading by the infeed device, while the second sensor means records essentially the presence of a fastener at the loading position and/or the injection of a fastener to this loading position.

Developments of the invention are the subject of the subclaims.

DETAILED DESCRIPTION OF THE DRAWINGS

The invention is detailed below using the figures on one embodiment.

FIGS. 1 and 2 show a fastener in the form of a nut and a sheet or a workpiece before inserting this nut into a hole prepared in a workpiece or after inserting and attaching the nut in the workpiece by pressing;

FIG. 3 shows in a simplified representation and in a side view one embodiment of the device according to the invention together with a press and with a tool provided in the press, for example, a follow-up tool;

DETAILED DESCRIPTION OF THE PREFERRED EMBODIMENTS

Figure 4:
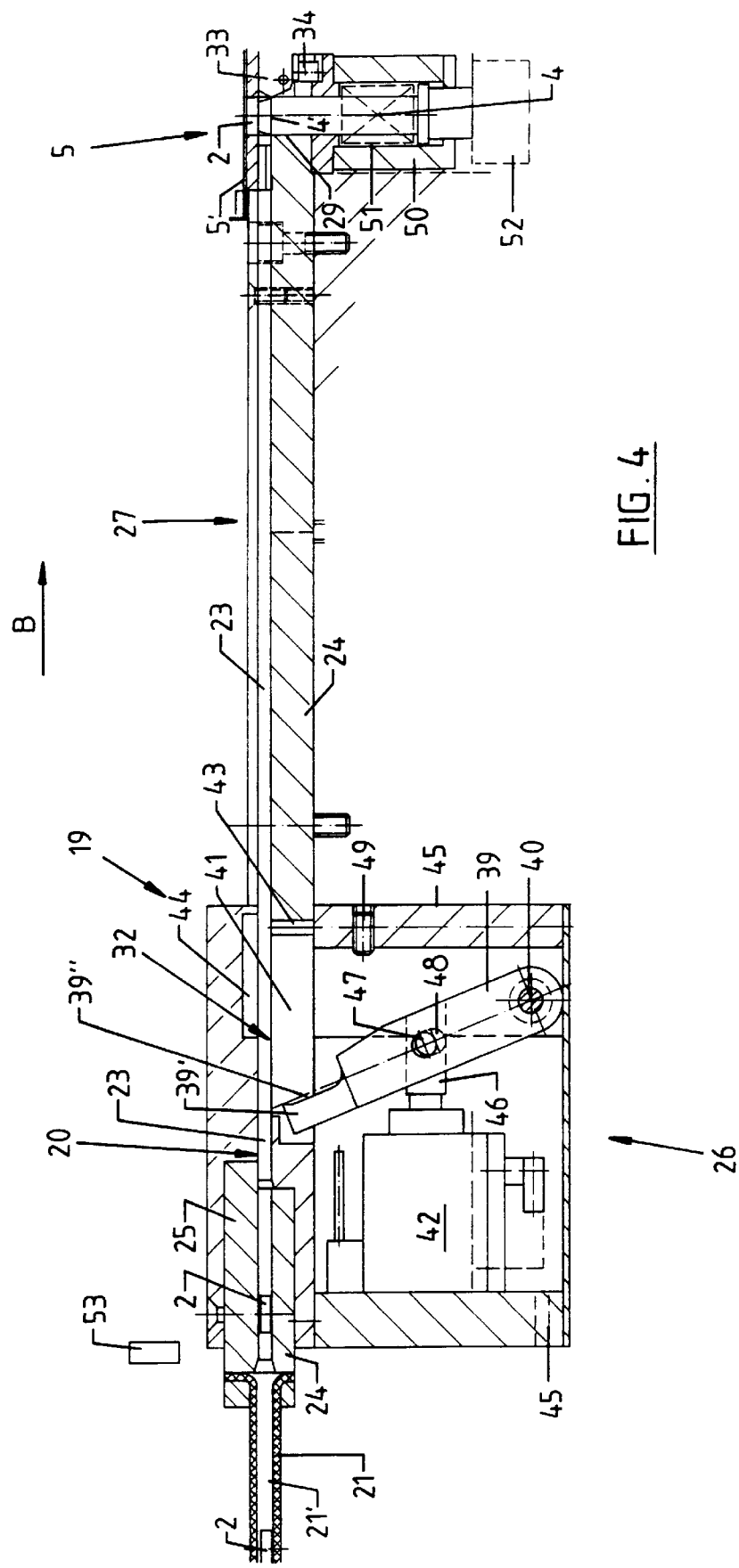
FIG. 4 shows in an enlarged partial representation and in cross section the device according to the invention.
Figure 5:
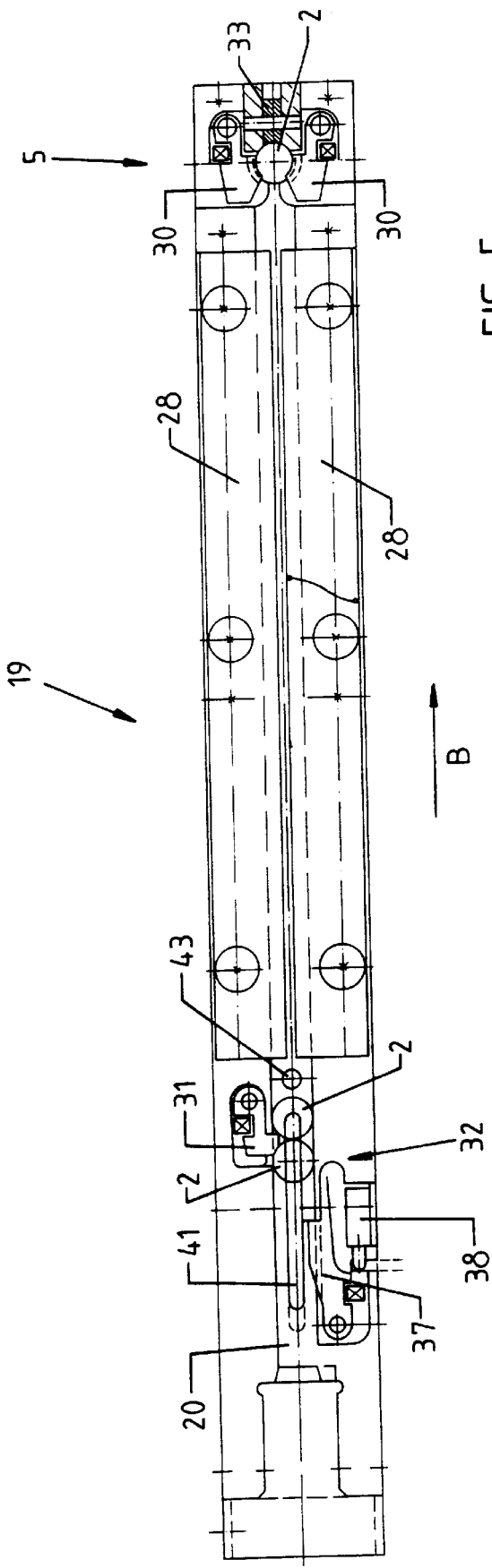
FIG. 5 shows in a simplified representation a horizontal section through the device of FIG. 4.
Figure 6:
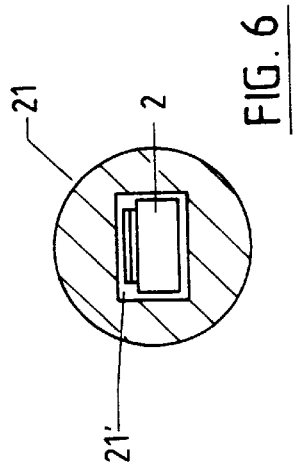
FIG. 6 shows a section through a hose for feed of the fasteners to the device.

In the FIGS., 1 is a workpiece which is produced from a sheet by punching and which is reproduced as a flat workpiece for the sake of easier representation, but which can also have any other necessary shape.

A fastener is labelled 2 which in the embodiment shown is made as a nut which can be attached with collar 2' in hole 3 made in the workpiece by punching, by inserting and by subsequently pressing using plunger 4 of a punching head 5 and wraparound ring 6 of an opposite tool 7, in workpiece 1.

Workpiece 1 is produced in press 8 in a tool which is provided in this press and which is for example a follow-on tool and among others also has opposite tool 7 with wraparound ring 6. As is detailed below, in this embodiment insertion of the respective fastener into pertinent opening 3 takes place from underneath.

Press 8 consists essentially of press frame 9 which forms lower part 10 of the press and on which press plunger 11 is guided to move up and down in the vertical direction.

On lower part 10 there is clamping plate 12 on which lower tool part 13 is attached directly or via an intermediate plate. On the bottom of press plunger 11 is clamping plate 14 to which upper tool part 15 is attached in the form of a force plate.

Furthermore, press 8 has spring-mounted hold-down 16 which is located between upper tool part 15 and lower tool part 13 and which is supported against workpiece 1 with press 8 closed via the force of hold-down springs 17 which act between hold-down 16 and tool part 15. In hold-down 16 for example there is also opposite tool 7 which is made as a slide or plunger.

For controlled feed of nuts 2 to "insertion area" 18 of the tool, on which (insertion area) these nuts are inserted each into pertinent opening 3 of workpiece 1, the device is used which is labeled 19 throughout in the FIGS. and which is mounted on lower tool part 13 such that punching head 5 is located in insertion area 18.

Device 19 forms rigid conveyor section 20 which is joined with its one end via flexible tube 21 to sorting and feed means 22. Via this sorting and feed means 22 which is set up beside press 8, nuts 2 are each supplied in a stipulated position or orientation (in position) individually to device 19 or conveyor section 20, by injection via hose 21, for which the sorting and feed means but also device 19 are controlled in the manner detailed below. For positioned feed of nuts 2 tube 21 has channel 21' with a rectangular cross section such that nuts 2 then fit in this cross section when they are oriented with their axis in the vertical direction and are arranged horizontally to the top with their collar 2'.

The general conveyance direction of conveyor section 20 is shown by arrow B in the Figures. The conveyor section consists for example essentially of guide groove or conveyor channel 23 which is made in carrier 24 and which is closed on its top by plate 25.

On the end of conveyor section 20 facing away from tube 21, loading and infeed means 26 is formed with a design which is detailed below. Conveyor section 20 passes there into conveyor section 27 which, like conveyor section 20 which is shorter than conveyor section 27, is made rigid and straight through guide groove 23 in carrier 24 and on its end away from means 26 has punching head 5.

To form conveyor section 27 guide groove 23 is closed by two plates 28 on the top of carrier 24 except for a narrow slot which extends in the longitudinal direction in the center of conveyor section 27.

During operation, conveyor section 27 is occupied by a stipulated number of nuts 2, such that these nuts tightly abut one another in the longitudinal direction or conveyance direction B of conveyor section 27 and in each downstroke of the press a precisely stipulated number of nuts is located in the conveyor section, with the first nut 2 on the end of conveyor section 27 which is away from means 26, in the area of punching head 5 or in the area of plunger channel 29 which is formed there and which intersects conveyor section 27.

On conveyor section 27 there are several spring-mounted retaining elements or return catches 30 and 31, i.e., two return catches 30 on punching head 5 or plunger channel 29 there and the return catch on the end of conveyor section 27 adjacent to device 26. Return catches 30 and 31 are each levers which can swivel against the action of a thrust spring or another spring element around a vertical axis and which extend with one hook end into conveyor section 27 such that they deflect nuts 2 which move in the conveyance direction (arrow B), but prevent nuts 2 from moving past against conveyor direction B. Thus respective nut 2 is held or positioned reliably in punching head 5 or plunger channel 29 by two return catches 30. Return catch 31 ensures that these nuts 2 which have been reloaded or inserted in the manner detailed below into conveyor section 27 cannot return from the conveyor section to device 26 or to loading positions 32 which is formed in conveyor section B directly in front of return catch 31.

On the end of conveyor section 27 which is away from device 26, i.e., in plunger channel 29 of punching head 5 there is furthermore ratchet 33 which can be swivelled against spring force and which interacts with an electrical sensor, for example, with a proximity sensor, and is swivelled against the action of a reset spring into an activated position when nut 2 is located in plunger channel 29. In this state the sensor delivers a positive signal which confirms the presence of a nut to control means 36 which controls device 19, especially also its loading means and feed means 22.

On means 26 in conveyor direction B in front of loading position 32 is swivelling ratchet 37 which is under the action of a spring and which interacts with sensor 38, for example, a proximity switch, and when nut 2 moves past to loading position 32 it is swivelled briefly out of inactivated position laterally into the activated position. Sensor 38 in doing so delivers to control means 36 a second control signal which confirms that nut 2 has passed.

As the infeed element means 26 has infeed rocker 39 which with its lower end under the level of conveyor sections 20 and 27 can be swivelled by means of hinge pin 40 around a horizontal axis which is perpendicular to conveyor direction A, i.e., around an axis which is perpendicular to the conveyor direction and at the same time also perpendicular to the axis of nuts 2 in conveyor sections 20 and 27.

In the embodiment shown, infeed rocker 39 is made of flat material essentially similar to a flat lever and with its larger surface sides is perpendicular to the axis of hinge pin 40.

The length of infeed rocker 38 and the swivelling angle for this rocker are selected such that the upper end which is away from hinge pin 40 or one end or a sword-like flat section 39' of the rocker which forms this end and infeed surface 39" which is formed by this section in the inactive position shown in FIG. 4 or the normal or initial position of rocker 39 are swivelled away from punching head 5 toward conveyor section 20 and are located under the plane of conveyor sections 20 and 27 so that nuts 2 can move above on infeed rocker 39 which is swivelled into the inactive position past the rocker to loading position 32. In the active position in which the rocker with its section 39' or with its infeed surface 39" is swivelled in the direction of punching head 5 and with its longitudinal extension is located essentially in the vertical direction, section 39' projects through slot 41 from underneath into the part of conveyor section 20 which runs in the area of means 26.

Swivelling of infeed rocker 39 takes place by double-acting pneumatic cylinder 42, in turn controlled by control means 36.

The basic mode of operation of device 19 which with punching head 5, rigid conveyor sections 20 and 27 and means 26 form a complete structural unit and as such can be mounted and dismounted in press 8 or a tool there can be described as follows:

When press 8 moves to its bottom dead center, if hold-down 16 rests against workpiece 1, a nut ready in the punching head is inserted from underneath into opening 3 of workpiece 1 using insertion plunger 4 which is moved by a ram which is provided in tool part 13 and which is moved upward by the motion of the tool, for example, by the motion of hold-down 16. During the subsequent downstroke of press 8 nut 2 is attached in workpiece 1 by pressing in the above described manner.

Infeed rocker 39 is in its initial or normal position. Last nut 2 which is in conveyor section 27 is safeguarded or kept in the correct position by return catch 31 and first nut 2 which is in punching head 5 or in plunger channel 29 is safeguarded or is held in the correct position by return catches 32 at least until this nut has been acquired by injection plunger 4 and has been moved into upper part of plunger channel 29.

If nut 2 which in plunger channel 29 is disposed of, i.e., this nut is attached to workpiece 1, after leaving bottom dead center of press movement via control means 36 feed means 22 is activated so that then another nut 2 is injected by this feed means via hose 21 with compressed air into conveyor section 20 and then reaches loading position 32. The spring force of return catch 31 there is set such that it stops the injected nut at loading position 32. The injected nut has passed ratchet 37 beforehand so that sensor 38 has delivered the second sensor signal to control means 36, this control means has therefore confirmed the presence of new nut 2 at loading position 32. Subsequently, cylinder 42 is activated for swivelling or an infeed stroke and subsequent return stroke of infeed rocker 39 from the initial position into its active position (infeed position) and back into the initial position, by which nut 2 which is ready at loading position 32 is pushed or reloaded on return catch 31 past into conveyor section 27, and in doing so the entire row of nuts 2 continues to move by the size of one nut so that in turn the first nut in conveyor section 27 reaches plunger channel 29. If a nut is ascertained to be present in plunger channel 29 by ratchet 33 and pertinent sensor 34, i.e., the first control signal is present, infeed rocker 39 remains in its inactive position. Feed means 22 is not activated again for injection of nut 2. The latter state is reached before press 8 again approaches its bottom dead center or reaches it.

Respective nut 2 is safeguarded in loading position 32 by ratchet 37. If nuts 2 are made of a ferromagnetic material, in loading position 32 respective nut 2 is secured again by permanent magnet 44 which is provided at loading position 32 above the conveyor section such that this magnet 44 exerts a force acting in conveyor section B on respective nut 2 at loading position 32; this, for example, is done by the magnetic focus or the focus of the magnetic field lines of permanent magnet 44 being shifted towards to return catch 31. There is another magnet 43 at the start of conveyor section 27.

One particular of device 19 also consists in that by the action of return catches 30 and 31 feed rocker 39 is swivelled only for a short infeed movement from the initial position into the infeed position and is otherwise in the initial position, so that even when press 8 is operating at high speed there is enough time for injection of nut 2 to loading position 32.

If conveyor section 27 is completely empty, as is the case for example in initial start-up of device 19, by control means 36 repeated injection of one individual nut 2 at a time in succession to loading position 32 takes place with subsequent swivelling of infeed rocker 39 out of the initial position into the infeed position for pushing nut 2 injected at the time into conveyor section 27 until the first sensor signal delivered by sensor 34 confirms the presence of nut 2 on plunger channel 29 and in this way injection of nuts 2 by feed means 22 is ended. It goes without saying that with this complete loading of conveyor section 27 cylinder 42 is activated for the infeed stroke each time only when the presence of nut 2 at loading position 32 has been confirmed beforehand by the second control signal of sensor 34.

Device 19 ensures flawless feed of nuts 2 to punching head 5. By means of individual injection of nuts 2 via hose 21 and empty conveyor section 20 to loading position 32 using compressed air, flawless feed of nuts 2 to this loading position 32 is ensured, even when hose 21 is long and greatly curved. Mutual sticking of nuts 2 in hose 21 is not possible.

By means of a sensor which is not shown it is furthermore ensured that control of functions takes place synchronously wit h the press stroke.

In the following means 26 and punching head 5 are detailed.

Loading and Infeed Means 26

As was already mentioned, important elements of this means are infeed rocker 39 and cylinder 42 which actuates this infeed rocker. To hold these elements, on the bottom of carrier 24 housing 45 is attached with which cylinder 42 is provided and also infeed rocker 39 is swivel-mounted. Piston rod 46 of cylinder 42 fits via pin 47 into longitudinal hole 48 which is provided roughly in the center of lever-like infeed rocker 39. An adjustable stop for infeed rocker 39 with which the infeed position of this infeed rocker can be exactly adjusted is labelled 49.

Permanent magnet 43 which follows loading position 32 in transport direction B supports continued movement of nut 2 from loading position 32 into conveyor section 27 and also prevents reloaded nut 2 from moving back. A plunger plate via which injection plunger 4 is activated is labelled 52. Another sensor which is labelled 53 is provided following return catch 31 at the start of conveyor section 27 and checks whether there is in fact nut 2 at the start of conveyor section 27 immediately after loading position 32.

Punching Head 5

On the end of conveyor section 27 away from means 26 punching head 5 forms plunger channel 29 which extends with its axis in the direction of the press stroke and which is open on top 5' of punching head 5 for applying respective nut 2. In this plunger channel or in housing 50 of punching head 5, the housing which is attached to carrier 24, injection plunger 4 can be moved against the action of compression spring 51 from a lower inactive position in which injection plunger 4 lies with its upper front surface in the conveyor plane of conveyor section 27 into a raised position in which then nut 2 which lies on the front face of injection plunger 4 is raised to the extent that it projects at least with its collar 2" for insertion into workpiece 1 and for pressing there over top 5'.

The invention was described above using one embodiment. It goes without saying that changes and modifications are possible without departing form the inventive idea underlying the invention.

Basically it is also possible to make loading position 32 such that there is room for at least two nuts 2 there following one another in transport direction B, then during each infeed motion of infeed rocker 39 in normal operation one nut 2 is moved into conveyor section 27, while second nut 2 remains in reserve in loading position 32 for the case in which another nut has not be re-injected at the proper time to loading position 32. It goes without saying that in this case feed rocker 39 can execute strokes of different size. Feed means 22 is controlled via control means 36 depending on the second control signal delivered by sensor 38 such that nuts 2 are re-injected in any case whenever there are not two nuts 2 at loading position 32.

What is claimed is:

1. A device for use in a press, having at least two antagonistic press parts, and for feeding fasteners and attaching said fasteners in workpieces by pressing, said device comprising:

a punching head for joining and pressing said fasteners in said workpieces, an infeed and loading means, a rigid feed forming a first conveyor section for receiving a plurality of fasteners;

said first conveyor section extending between said punching head and a loading position on said rigid feed, loading means with said infeed and loading means on said loading position for moving said fasteners, one after another, from said loading position into said first conveyer section to form a row of fasteners extending into said punching head, wherein said fasteners tightly abut one another, said punching head, said rigid feed and said infeed and loading means forming a unit which is attached to one of said two antagonistic press parts, means for individually supplying said fasteners from outside-feed means by injection via a second conveyor section to said loading position, wherein said infeed and loading means is movable with an infeed stroke from an initial position outside said rigid feed into said rigid feed and along said rigid feed and with a reverse stroke back into said initial position, each time, immediately after completion of the said infeed stroke, and at least one stop for said fasteners on said loading position such that each fastener injected to said loading position passes said stop only with infeed by said infeed and loading means.

2. A device according to claim 1, wherein said fasteners are supplied to said loading position via an external conveyor section, individually by injection.

3. A device according to claim 1, wherein said fasteners are nuts, wherein said nuts have axes parallel to one another and perpendicular to a conveyor direction in said external conveyor section, and wherein said external conveyor section is formed by a hose with a rectangular channel with adapted to a shape of said nuts in cross section.

4. A device according to claim 1, wherein said at least one stop is formed by one of an elastic stop element or and a ratchet.

5. A device according to claim 4, wherein at least one stop is a return catch.

6. A device according to claim 1, further comprising first sensor means disposed on an end of one of said rigid feed and said punching head said first sensor means delivering a control signal to a control means when one of said fasteners is present, said control means controls an external feed means and one of said loading means and said infeed element so that said fasteners are individually and in time sequence injected in succession to said loading position and are moved from said loading position by said infeed element, which executes an infeed and return stroke motion into said first conveyor section, until said control signal from said first sensor means is present.

7. A device according to claim 6, further comprising a second sensor means disposed on said second conveyor section in front of said loading position, wherein when said one of said fasteners is conveyed to said loading position, said second sensor means delivers a second control signal which confirms passage of said one of said fasteners, and wherein activation of said infeed element only occurs when said second control signal is present.

8. A device according to claim 7, wherein control of said external feed means and said loading means takes place via control electronics depending on first and second control signals from said first and second sensor means, respectively, so that whenever a predetermined number of said fasteners is not present at said loading position, said fasteners are conveyed to said loading position until said predetermined number of said fasteners is present, and when no one of said fasteners is present in said punching head said first conveyor section is reloaded by movement of said infeed element and by injection of said fasteners to said loading position said first conveyor section is reloaded until a first fastener present in this conveyor section is in a plunger channel.

9. A device according to claim 6, further comprising a third sensor means which detects a lifting motion of said press.

10. A device according to claim 1, wherein said infeed element is an infeed rocker.

11. A device according to claim 1, wherein said infeed element is actuated by an actuation means.

12. A device according to claim 1, further comprising at least one magnet disposed on one of said loading position, said first conveyor section, and both said loading position and said first conveyor section.

* * * * *